United States Patent [19]
Akeel et al.

[11] Patent Number: 5,367,944
[45] Date of Patent: Nov. 29, 1994

[54] SENSOR FOR USE IN A FLUID TRANSFER SYSTEM

[75] Inventors: Hadi A. Akeel, Rochester Hills; John A. Reinicke, Bloomfield Township, Oakland County, both of Mich.

[73] Assignee: FANUC Robotics North America, Inc., Auburn Hills, Mich.

[21] Appl. No.: 86,539

[22] Filed: Jul. 1, 1993

Related U.S. Application Data

[63] Continuation-in-part of Ser. No. 771,436, Oct. 4, 1991, Pat. No. 5,238,029.

[51] Int. Cl.$^5$ ............................................. F01B 25/26
[52] U.S. Cl. ................................................ 92/5 R; 91/1
[58] Field of Search .................. 92/5 R; 91/1, DIG. 4

[56] References Cited

U.S. PATENT DOCUMENTS

| | | |
|---|---|---|
| 2,446,657 | 8/1948 | Mac Leod et al. ............. 91/DIG. 4 |
| 3,654,549 | 4/1972 | Maurer et al. . |
| 3,726,191 | 4/1993 | Johnston et al. ..................... 92/5 R |
| 4,121,504 | 10/1978 | Nowak ................................. 92/5 R |
| 4,793,241 | 12/1988 | Mano et al. . |
| 4,897,603 | 1/1990 | Bieber et al. . |
| 5,024,250 | 6/1991 | Nakamura ...................... 91/DIG. 4 |

FOREIGN PATENT DOCUMENTS

| | | | |
|---|---|---|---|
| 3803268 | 4/1989 | Germany | 92/5 R |
| 0138966 | 10/1979 | Japan | 92/5 R |
| 0924765 | 5/1963 | United Kingdom | 92/5 R |
| 2195711 | 4/1988 | United Kingdom | 92/5 R |
| 542848 | 1/1977 | U.S.S.R. | 92/5 R |

*Primary Examiner*—Thomas E. Denion
*Attorney, Agent, or Firm*—Brooks & Kushman

[57] ABSTRACT

A sensor for measuring the amount of a fluid such as electrostatically charged paint in a canister wherein part of the sensor moves within a cavity which is insulated from the paint. A body such as a piston moves linearly within the canister to dispense the paint from the canister. In two embodiments, the sensor is a non-contact sensor including a magnet which moves with the piston and creates a magnetic field in the cavity. A ferromagnetic device of the sensor moves linearly along a sensor element in the cavity in response to movement of the magnetic field created by the moving magnet. In another embodiment, the sensor includes an elongated pliable cable connected at one end thereof to the piston to move therewith. The opposite end of the cable is connected to a sensor element of the sensor such as a rotary encoder. Each sensor provides a signal to allow the metering of the paint entering or/and discharged from the canister.

25 Claims, 6 Drawing Sheets

SENSOR FOR USE IN A FLUID TRANSFER SYSTEM

CROSS-REFERENCE TO RELATED APPLICATION

This application is a continuation-in-part application of U.S. application Ser. No. 771,436, filed Oct. 4, 1991, now U.S. Pat. No. 5,238,021 and entitled "Method And System For Fluid Transfer And Non-Contact Sensor For Use Therein".

TECHNICAL FIELD

This invention relates to sensors and, in particular, to sensors for use in fluid transfer systems.

BACKGROUND ART

In production paint operations, painters change the color of the sprayed paint by disconnecting their spray guns from one paint supply line, paint drop, and connecting it to another paint drop of a different color. The old paint color is purged by discharging a small amount of the new color through the spray gun.

In contrast to manual painting, automated painting machines require the addition of automatic color changers. These devices use valves, manifolds, and occasionally long tubes to connect different color paints to the spray gun, purge the lines, valves, manifolds, and the spray gun with solvent, and refill with a new color paint. The long tubes cause considerable waste of valuable paint material and the use of much solvent to purge and clean the lines during color changes. Environmental concerns have been raised about the disposal of such materials and a more economical way for changing paint color has been eagerly sought.

One option for addressing environmental concerns has been the charging of the painting material with a high voltage electrostatic charge, exceeding 100 KV, which helps improve its coating efficiency and the economics of painting. Solvent based paints have been successfully sprayed with electrostatic charge by virtue of their natural insulating properties.

Another desirable option for addressing the environmental concerns has been the use of water based paints which pose much less threat to the environment than solvent based paints. Unfortunately, such paints are conductive of electricity and can be sprayed electrostatically only from insulated canisters, disconnected from the paint supply lines. The filling, purging, cleaning, and refilling of such canisters with different paint colors has been a challenge looking eagerly for economic solutions, particularly for high volume production operations requiring frequent color changes.

U.S. Patent No. 4,313,475 to Wiggens addresses these challenges by means of a system of supply lines, color changers, valving arrangements, and air entrapping containers to fill the containers from the supply line, when the electrostatic charge is turned off. Valves are actuated to cause a discontinuity in the supply line, termed voltage block, that isolates it from the charged paint in the canister. Air entrapped in the container and pressurized by the filling of the canister causes the paint to flow from the canister to the spray equipment while the paint is electrostatically charged.

U.S. Pat No. 4,771,729 to Planert et al; U.S. Pat. No. 4,932,589 to Diana; U.S. Pat. No. 4,879,137 to Behr et al; and U.S. Pat. No. 4,921,169 to Tilly all disclose various methods and apparatus for electrostatically coating a conductive material utilizing an electrical isolation mechanism, including a reservoir into which a metered volume of paint to be sprayed is introduced.

With the advent of robots, production spray painting became more efficient and attained higher quality. Color changing for robots followed the lead of automatic spray machines by using automatic color changers. However, the mobility of the robot also caused the spray lines to become longer and require more solvents to purge and clean. Electrostatics also cause damage to the long flexible supply lines as they get in contact with grounded surfaces, and eventually fail. To continue the use of electrostatics, especially with water based paints, a better method is sought for paint delivery, color changing, and electrostatic isolation, for robotic paint spray equipment.

The current approach is to connect a spray applicator by means of fluid lines to an outlet port of a paint color changer. The color changers-is piped to a series of paint outlets (color drops). The color changer controls the flow of paint, air and cleaning solvents to the applicator by means of a valving arrangement. Valves are selectively opened or closed to pass the appropriate paint color to the applicator, to purge the fluid lines with air or solvents, and to clean the lines between.

Most methods of delivering paint by robots to a workpiece keep the robot connected to the supply lines by means of hoses. The length of the hoses causes paint to be wasted during color change, waste of robot time when idled for purging and color change, and restricts robot mobility.

For electrostatic painting with conductive paints, such as water based paints, the charging of the paint causes the high voltage charge to be communicated to the rest of the paint supply system through the paint lines, hence impeding the use of such paints despite their environmental advantages.

Most current methods for painting with robots require the use of automatic color changers with a multiplicity of valves and control solenoids to connect the appropriate color to the spray gun of the robot and to provide sequenced operations for color changing and line cleaning. This is not always a necessity and adds expense and complexity to the painting process.

In contrast with the above, manual painting requires no color changers as the person has the ability to connect his spray gun to the source of the desired color directly and disconnect it when he is finished using that particular color. Cleaning is also limited to the spray nozzle since the paint delivery lines need not be cleaned as they do not pass different color paint, hence manual painting uses little cleaning solvents. Furthermore, less time is spent to switch from one color to another, without paint line cleaning, allowing more time for productive painting. However, manual painting is known to be deficient in quality.

U.S. Pat. No. 4,785,760 to Tholome discloses a sprayer installation including a robot, a sprayer carried by the robot and a storage tank for a fluid, such as paint to be sprayed, also carried by the robot.

The mobility of the robot simplifies its operation and eliminates the need for automatic color change equipment. Mobility of the robot is also used to eliminate the need for special insulating provisions to isolate the spray equipment from the paint supply lines. The robot mimics manual painting operations rather than automatic machine operations, hence, requiring no automatic color changers, and no special voltage blocks for periods of electrostatic spraying.

U.S. Pat. No. 3,674,207 to Carbonetti, Jr. et al; U.S. Pat. No. 4,944,459 to Watanabe et al; and U.S. Pat. No. 5,029,755 to Schmidt et al all disclose the use of a robot or manipulator which is utilized with other apparatus to change paint color.

U.S. Pat. No. 4,897,603 to Bieber et al; U.S. Pat. No. 4,793,241 to Mano et al; and U.S. Pat. No. 3,654,549 to Maurer et al all disclose various position sensors having inductive elements. Mauer et al senses piston position directly and has elements exposed to third or in extended chambers or have induced rotations. Mauer et al uses mechanically captive motion followers which must be internal to a cylinder bore. Also, the magnetic field of Mauer is used for sensing where magnetic strength is not critical.

SUMMARY OF THE INVENTION

An object of the invention is to provide an improved sensor for metering the flow of fluid in a container wherein part of the sensor moves within a cavity which is insulated from the fluid.

In carrying out the above object and other objects of the present invention, a sensor is provided for sensing the position of a body which moves linearly in an environment. The sensor includes an assembly including means for defining a cavity insulated from the environment and coupling means for coupling the motion of the body to the outside of the environment. The coupling means is adapted to be connected to the body to move linearly therewith. The assembly further includes a sensor part disposed within the cavity and coupled by the coupling means to move in response to the movement of the body wherein the assembly has a property which is a function of the motion of the sensor part.

In two embodiments of the invention, the coupling means is a magnet magnetically coupled to the sensor part.

In another embodiment, the coupling means is an elongated pliable transmission device mechanically connected to the sensor part.

Further in carrying out the above object and other objects of the above invention, a non-contact sensor for sensing the linear position of a body which moves linearly in an environment is provided. The sensor includes an assembly having means for defining a cavity insulated from the environment and generating means for generating a magnetic field within the cavity. The generating means is adapted to be coupled to the body to move linearly therewith. The assembly includes a sensor element disposed within the cavity and a ferromagnetic device supported for linear movement within the cavity to move in response to movement of the generating means and its magnetic field along the sensor element. The sensor element has a property which is a function of the position of the device along the sensor element within the cavity. The sensor is adapted to provide a signal representative of the property of the sensor element whereby the position of the device along the sensor element in the cavity is indicated.

Preferably, the generating means includes a magnet.

Still further in carrying out the above object and other objects of the present invention, a sensor is provided for sensing the position of a body which moves linearly in an environment. The sensor includes an assembly having means for defining a cavity insulated from the environment and an elongated pliable transmission means for transmitting the motion of the body to the outside of the environment. The transmission means is adapted to be coupled to the body to move linearly therewith. The assembly also has a sensor element disposed within the cavity and connected to the transmission means to move in response to the movement of the body. The sensor element has a property which is a function of the motion of the sensor element.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic side elevational view, partially broken away and in cross-section, illustrating a fluid transfer system;

FIG. 2 is a cross-sectional view of a canister and actuating cylinder illustrating passages feeding into a manifold for spray gun control;

FIG. 3 is a side elevational view partially broken away of a paint drop cluster wherein different color drops share a single casing;

FIGS. 4–7 are enlarged side elevational views, partially broken away and in cross-section illustrating the details of the mechanism for filing the canister and the procedure for doing so;

FIG. 8 is similar to FIGS. 4–7 but illustrate the step of maintaining the contents of the canister in a sealed condition;

FIG. 9 is a view similar to FIG. 1 but illustrating another embodiment of the fluid transfer system;

FIG. 10 is an enlarged side elevational view, partially broken away and in cross-section, illustrating the canister of FIG. 1 with a non-contact sensor of the present invention;

FIG. 11 is an end sectional view of the canister of FIG. 10;

FIG. 12 is a perspective view, partially broken away and in cross-section, of a second embodiment of a non-contact sensor of the present invention; and FIG. 13 is a schematic side elevational view, partially broken away and in cross-section, illustrating a third embodiment of a sensor of the present invention.

BEST MODE FOR CARRYING OUT THE INVENTION

General Description

Referring to FIG. 1, in a fluid transfer system in which a sensor of the present invention is to be used, a transfer device such as a robot, generally indicated at 10, carries a reservoir or canister, generally indicated at 12, and uses the fluid contained therein to spray an object by way of a spraying device, such as a spray gun 14. The canister 12 is filled with the fluid such as a paint of a desired color and is fixedly attached to a robot part such as a robot wrist 16 or a robot arm part 11' as illustrated in FIG. 9.

When the canister 12 is emptied, the robot 10 "docks" at a paint supply station, connects the canister 12 to the source of paint by means of a check-valved connection similar to that used with manual painting, and allows the canister 12 to be refilled by the desired paint. When the color is to be changed, the robot 10 initiates a sequence to clean the canister 12 before refilling, and prepares it to accept a different color paint without risk of contamination by residues remaining from a previously used paint color.

In one embodiment, the cleaning sequence is initiated internal to the robot 10, and the robot 10 connects to individual paint drops, each having a different color paint, hence eliminating the need for automatic color changers. This method requires that the robot 10 either carries its own solvent and air cleaning lines, or is programmed to go to docking locations of solvent and air lines, preferably adjacent to the docking locations of the paint supply lines.

In another embodiment, the robot 10 is connected to a color changer and the sequence of cleaning is initiated through the valves of the color changer. While this approach has the expense of a color changer associated with it, it may be applied to robots in existing installations already having automatic color changers as it relieves the robot 10 from carrying the cleaning lines, and relieves its controller from the task of programming several locations for filling from different paint drop locations. The fluid transfer system would still have the advantages of eliminating long paint supply lines and its ability to accommodate electrostatic water-based, as well as solvent-based, paints without special insulating provisions for purging and filling.

In support for the fluid transfer system, a docking valve arrangement is provided to enable the attachment of the canister 12 to the paint drops which cleans the interfaces before connections are made, and maintains a protective cover over the filling interface during the spraying operation, hence avoiding color contamination between canister fillings.

A non-contact sensor of the present invention is described below to allow metering of the filling of the canister 12 in order to use only the exact amount of paint as needed to finish painting a known object.

Without lines connecting the paint reservoir to the paint supply lines, the fluid transfer system is ideal for use with electrostatically charged and conductive paint materials. It eliminates the need for elaborate, complex, and expensive isolation methods, known as voltage blocks, to keep the electrostatic charge from leaking to the normally grounded paint supply lines.

Detailed Description

With reference again to FIG. 1, the canister 12 is mounted to a part of the robot 10, such as the hollow wrist 16, and may be filled with fluid by docking a check valve or valve assembly, generally indicated at 18 with a fluid supply outlet, such as a check valve or paint drop, generally indicated at 20, and clamping them together by means of an actuating cylinder, generally indicated at 22, to effect fluid communication between the paint drop 20 and the canister 12. The hollow wrist 16 may generally be of the type disclosed in U.S. Pat. No. 4,708,580 to Akeel.

Figures 1, 2, 3:
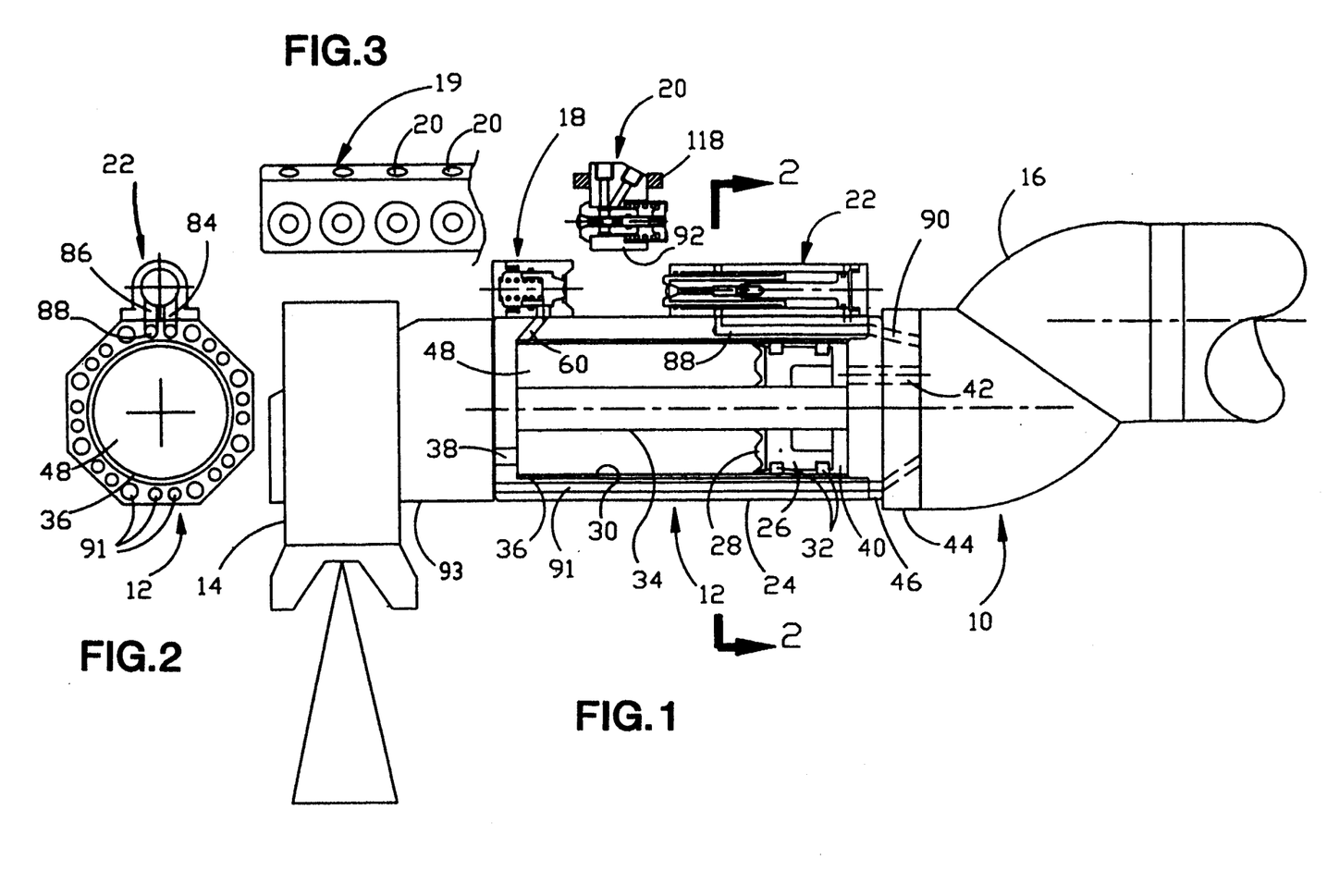

The canister 12 consists of a cylinder 24 which encloses a piston 26 which has a scraper seal 28 attached to a front face of the piston 26 and which slidably engages an internal cylindrical surface 30 of the cylinder 24 to scrape paint off the surface 30.

Spaced bearing rings 32 circumferentially mounted on the piston 26 provide side support for the piston 28 against possible frictional moments resulting from the movement of the scraper seal 28 inside the cylinder 24.

A central post 34 is used to guide linear movement of the piston 26 and for inclusion of a piston position sensing device as described hereinbelow.

A cylinder liner 36 provides a favorable sliding and scraping surface for the scraper seal 28. The piston 26 may be propelled toward a port 38 in the canister 12 by means of pressurized fluid, such as air, introduced into a cavity 40 on one side of the piston 26 through a port 42 in a manifold 44 and a cylinder cap 46 of the canister 12. When a cavity or reservoir 48 of the canister 12 is full of fluid, such as paint, the fluid is propelled on the opposite side of the piston 26 to flow through the port 38 for productive use, such as spray painting.

Figure 4:
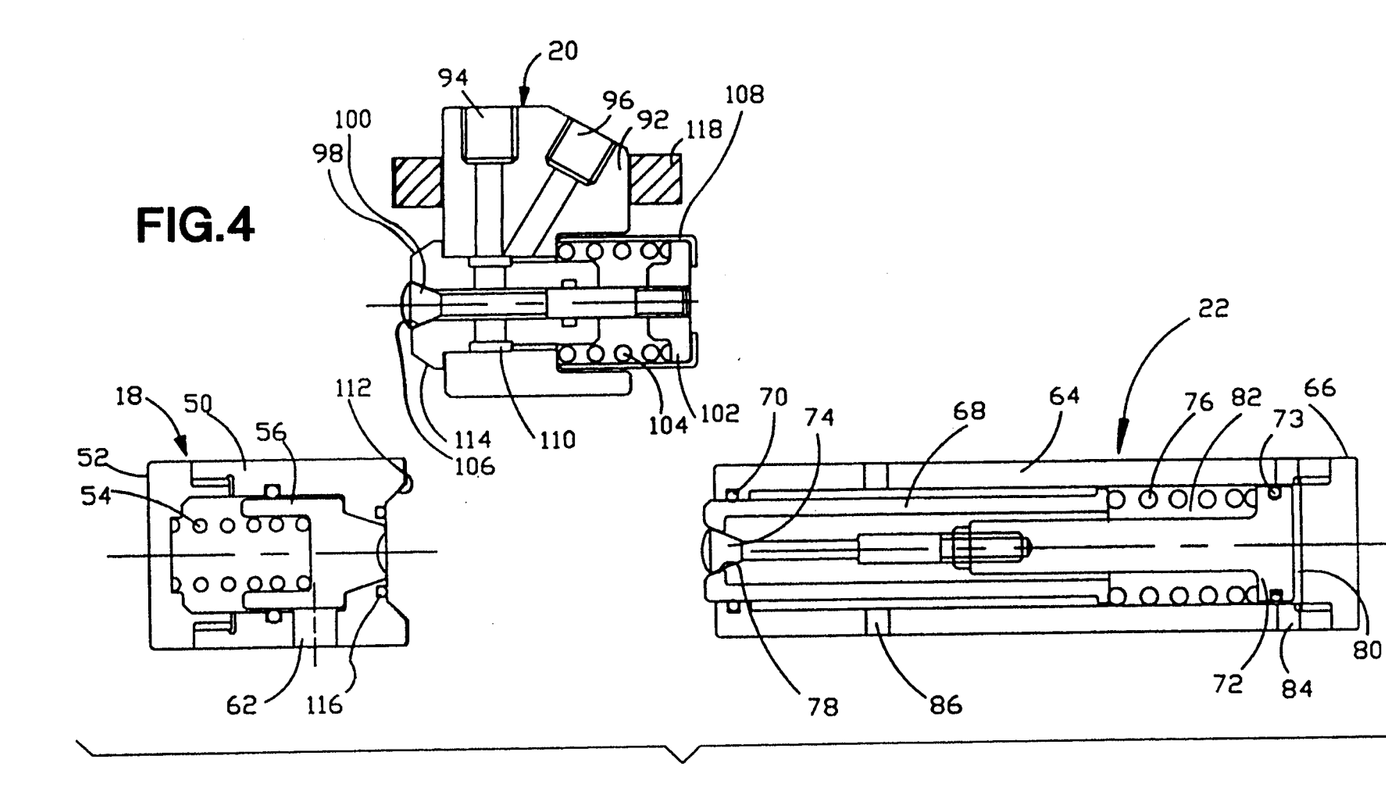
Figure 7:
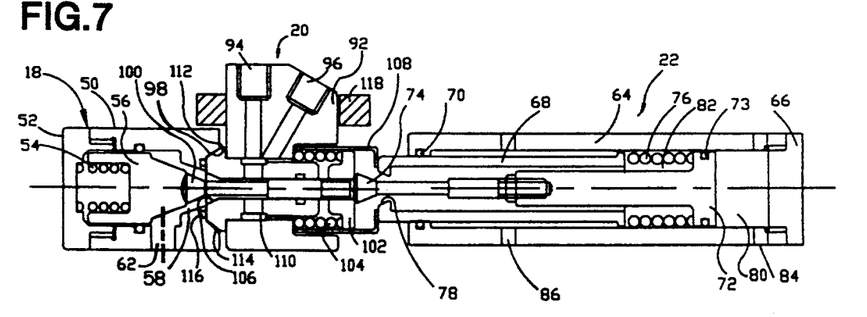

The check valve 18, as illustrated in detail in FIG. 4, includes a casing 50 and an end cap 52 which encloses a spring 54 which acts on a check valve puppet 56 to close a port 58 in the casing 50 as best shown in FIG. 7. The check valve 18 mounts on cylinder 24 as shown in FIG. 1, such that a port 60 in the cylinder 24 and a port 62 in the casing 50 are in fluid communication.

The actuating cylinder 22 has a cylinder body 64 closed at one end thereof by an end cap 66 and at its other end by the sealed engagement of a plunger 68 and a sealing means such as a circular seal 70. A piston 72 is sealingly mounted for sliding movement within the cylinder body 64 by a seal 73. The piston 72 is connected to a check valve puppet 74 to move linearly through and is biased away from the plunger 68 by a spring 76 to effect the closing of a port 78 in the plunger 68 by the check valve puppet 74.

Figure 9:
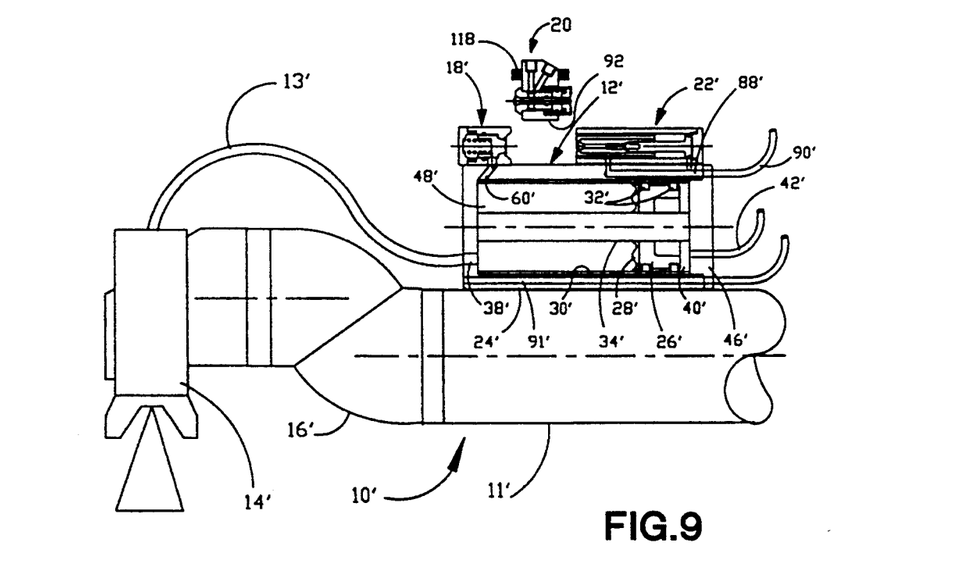

The seal 70 allows the piston 72 to be slidably actuated by means of pressurized fluids introduced into cylinder cavities 80 and 82 at ports 84 and 86, respectively. The cylinder body 64 mounts on the canister body or cylinder 24 such that the ports 84 and 86 are in fluid communication with fluid supply passages, such as a passage 88 as shown in FIG. 1. The passage 88 is communicated to external control valves (not shown), through ports such as a port 90 in the manifold 44 and the end cap 46. Alternatively, the ports 84 and 86 may be communicated to such external control valves by means of hard or flexible tubing as illustrated in FIG. 9.

Figure 8:
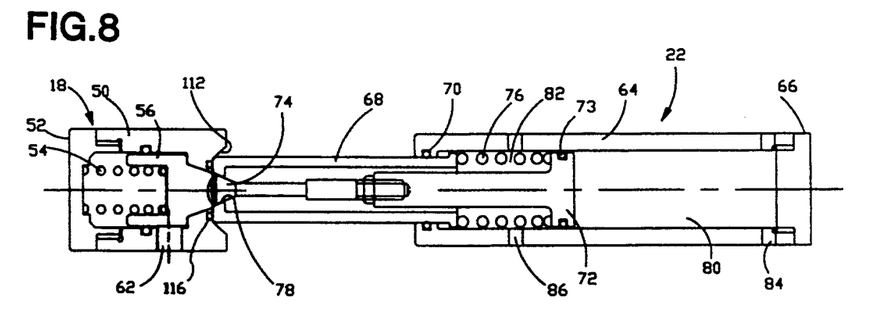

As shown in FIG. 8, the cylinder 22 is mounted in axial alignment with the check valve 18 such that the extension of the plunger 68 causes the puppet 74 to engage the check valve puppet 56 in a mating arrangement, the purpose of which is described below.

Referring to FIG. 2, there is illustrated control passages 91 in the cylinder 24 which feed into a manifold 93 for spray gun control functions.

Referring to FIG. 3, there is illustrated a paint drop cluster, generally indicated at 19, having different color drops 20, 20' etc. which share a single casing.

As illustrated in FIG. 4, the paint drop 20 has a casing 92 with supply and return ports 94 and 96, respectively, and a cartridge 98 containing a check valve puppet 100 with an end cap 102. A spring 104 keeps the check valve 20 closed as the spring 104 acting on the end cap 102 forces the puppet 100 against a valve seat 106 of the cartridge 98. A spring housing 108 keeps contaminants away from the check valve assembly.

Normally, fluids such as paint are continuously circulated through the paint drop 20 as they enter through the supply port 94 and exits through the return port 96. Paint circulation keeps paint pigments from forming sediments inside a paint drop cavity 110 within the cartridge 98 and maintains paint color uniformity.

Canister Filling

The paint drop 20 is mounted to any fixed structure by means of supports 118. The supports 118 are compliant to accommodate the lateral movement that is necessary to assure a firm sealing engagement at the interface between the paint drop 20 and the check valve 18.

Figure 5:
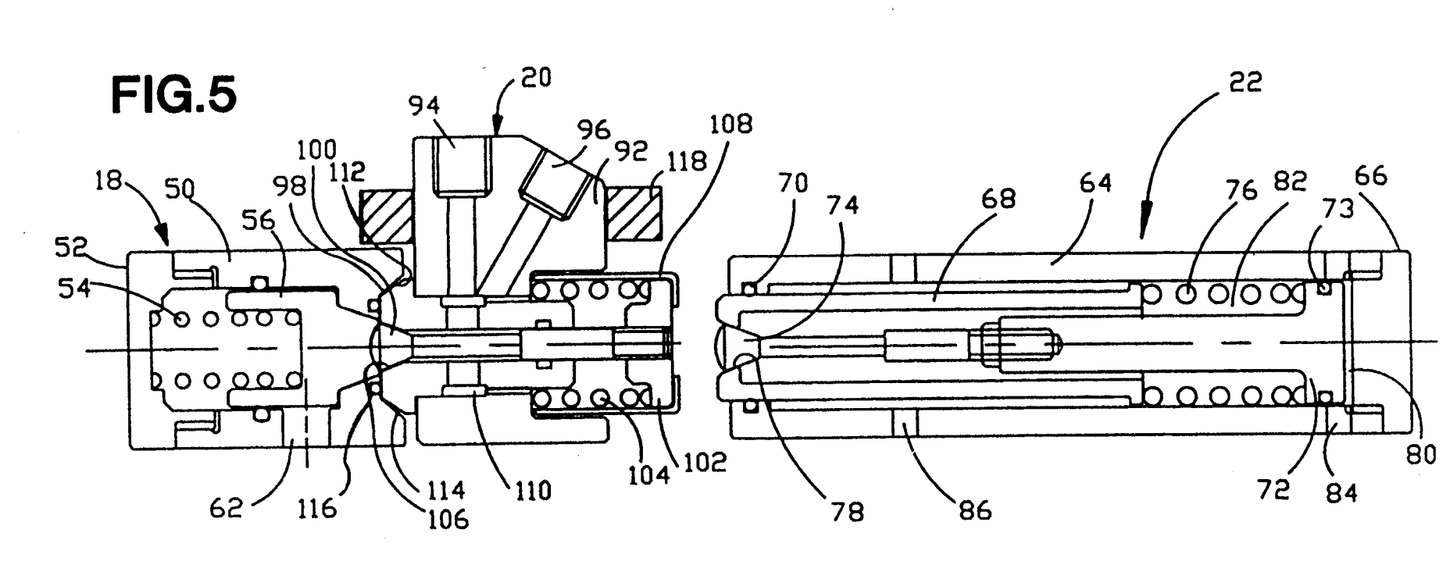
Figure 6:
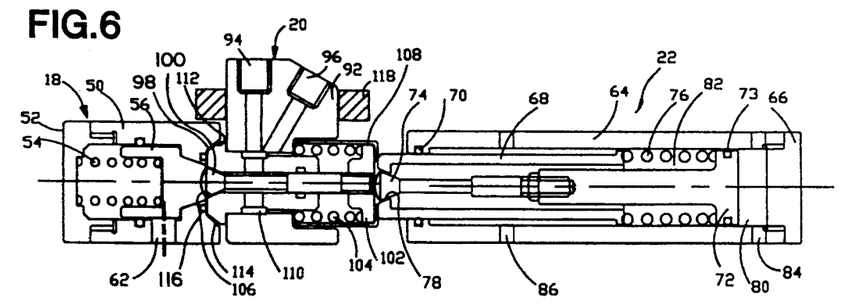

To fill the canister 12 with paint from the paint drop 20, the robot wrist 16 is moved to allow the check valve 18 and the cylinder 22 to straddle the paint drop 20 as shown in FIG. 1. The wrist 16 is then moved to engage the check valve 18 with the paint drop 20 in a butted arrangement as shown in FIG. 5. Conical engagement surfaces 112 and 114 help guide the engagement. The cylinder 22 is then activated by introducing pressurized air through the port 84 into the cavity 80 to engage the plunger 68 with the spring housing 108, as shown in FIG. 6, and help secure the sealing engagement of surfaces 112 and 114 by compressing a seal 116 in the casing 50.

Further movement of the piston 72 compresses the spring 76 and advances the valve puppet 74 against the end cap 102 to compress the spring 104 and engage the puppet 100 with the puppet 56 as both progressively move in the same direction to open both check valves and allow fluid communication between the port 58 and the cavity 110, as shown in FIG. 7. Paint is then allowed to flow from the supply port 94 of the paint drop 20 through the ports 58, 62 and 60 into the canister cavity 48.

Normally, filing is initiated when the cavity 48 is at minimum volume. As paint flows into the canister 12, it displaces the piston 26 to increase the cavity 48 and reduce the cavity 48 until the desired volume of paint has been introduced into the canister 12. The volume of paint may be metered by timing the flow of paint into the cylinder, by monitoring the displacement of the piston by means of linear potentiometers, for example, or by any method of flow measurement techniques.

When the desired quantity of paint is in the canister 12, a programmable controller (not shown) shuts off the pressurized fluid, or air, from the port 84 and allows the spring 76 to expand thus retracting the piston 72 and the check valve puppet 74 away from paint drop 20. The spring 104 then expands and causes the puppet 100 to retract and close the port 106, thus shutting off the flow of paint into the valve 18 and the canister 12. Simultaneously, the puppet 56 moves under the action of its spring 54 to close the port 58, hence trapping the paint inside the canister 12.

When air is introduced into the cylinder body 64 through the port 86, the piston 72 is moved into the cavity 80 thus causing the plunger 68 to recede into the cylinder body 64 thus freeing the engagement with the paint drop 20. The robot 10 then moves away from the paint drop 20 and air is introduced into the cylinder body 40 at the port 84 to move the plunger 68 into engagement with the check valve 18, hence protecting the cleanliness of the port 58 from contamination and to prepare the canister 12 for filling with the same or a new color paint. The robot 10 then begins its painting sequence, using the paint contained in the canister 12.

For refilling with the same paint, the sequence described above is repeated at the same paint drop 20.

For changing color, the canister 12 is first cleaned before the sequence described above is repeated at another color drop 20' of the new desired paint color illustrated in FIG. 3.

Canister Cleaning

Cleaning of the canister 12 is done while the plunger 68 is in a sealed engagement with the valve assembly 18 as shown in FIG. 8. High pressure fluid, such as air, is introduced at the port 84 to force the puppet 74 to engage the puppet 56 and allow fluid communication between the port 78 and the port 58. Cleaning fluid, preferably shots of cleaning solvents and air, is introduced through the port 86 to pass through the cavity 82 and ports 78, 58, 62, and 60 into the canister 12, and then through the port 38 to the spray gun 14 or a dump valve (not shown), hence washing away any paint residues that may cling to the surfaces of the canister 12 and its contained parts. When cleaning is finished, the canister 12 may be dried by passing air only through the port 86. When cleaning and drying is complete, the canister 12 is then ready for storage or for filling with a new color.

By providing a dielectric insulator between the canister 12 and the mounting robot part, the paint can be charged with high voltage electrostatic charge without causing the charge to leak to the grounded robot parts. With no connection between the canister and the paint drops, 20, 20', etc., after disengagement, the system requires no elaborate or costly isolation by voltage block arrangement as described in the prior art.

Referring to FIG. 9, there is illustrated another embodiment of the fluid transfer system wherein parts which perform the same or similar function to the parts of the first embodiment have a prime designation. In FIG. 9, a canister, generally indicated at 12' is mounted on an arm 11' of a robot, generally indicated at 10'. An external paint house 13' provides paint to a spray gun 14'. External gun control lines 90' and 42' provide control signals to control the functioning of the canister 12'. Spray gun control lines (not shown) internal to the robot arm 11' and the wrist 16' provide control signals to the spray gun 14'.

As in all robotic arrangements, the fluid transfer system is usually controlled by a programmable controller which can be programmed to introduce fluids through different valves in a timed and desired sequence.

Non-Contact Position Sensor

Figure 10:
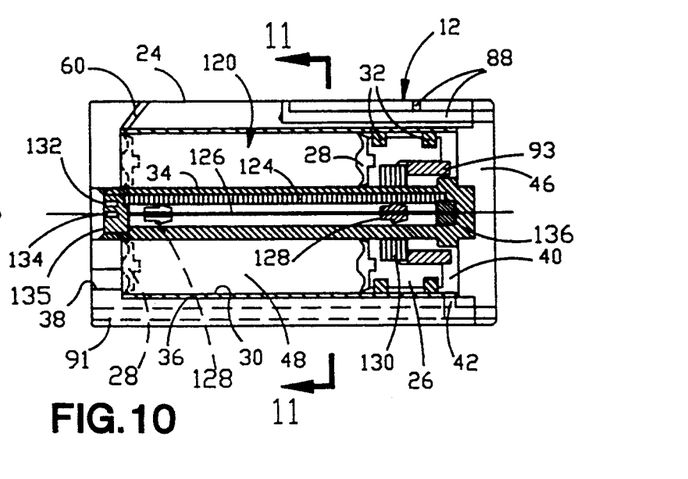
Figure 11:
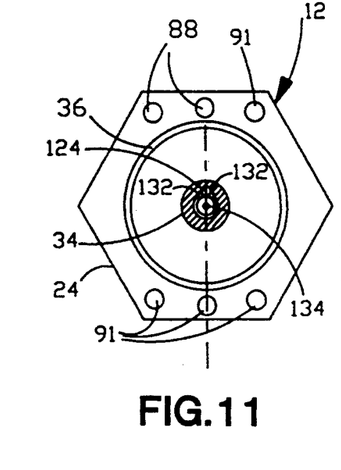

In order to sense the linear position of the piston 26 in the canister 12 without contacting with the piston 26, a non-contact positioning sensor generally indicated at 120 is provided as illustrated in FIGS. 9 and 10. The paint within the cavity 48 is electrostatically charged at high voltage, typically 100 KV. As previously mentioned, the piston 26 is displaced by pressurized paint entering the cavity 48 at the port 60 to be discharged to the spray device 14 through the port 38 by introducing pressurized air through the port 42 into the cavity 40 while port 60 is closed by a check valve (not shown). The seal 28 cooperating with the guide rings 32 help separate the paint and air chambers 48 and 40, respectively. A spacer 93 prevents the piston 26 from engaging the end of the cylinder 24.

The sensor 120 monitors and controls the position of the piston 26 as it travels inside the canister 12 to allow the metering of the amount of paint entering into, or discharged from, the canister 12. Exposing conventional sensors, such as potentiometers, encoders, linear variable differential transformers (LVDT), or the like to the paint is impractical. Hence, a non-contact sensor that is isolated from the paint environment of the piston 26 is a necessity. Sensors that track the piston from outside the canister 12 are possible to install, but when space is limited, an internal sensor is required and should be insulated from the pain and electrostatic environment.

As shown in FIG. 10, the sensor 120 includes the hollow, plastic central post 34 containing a sensor element 124, a guide wire or element 126 and a tracer element 128. The sensor element 124 may be of any conventional type, such as a potentiometer resistive element, a toothed encoder element, an optical or magnetically encoded element or the like.

A mechanism for generating a magnetic field such as a magnet 130 is secured to move with the piston 26 and is mounted such that it traps the tracer element 128 by its magnetic field. The tracer element 128 is made of a ferromagnetic material so as to be responsive to the magnetic field of the magnet 130, and is mounted to slide along the guide element 126 while it engages the sensor element 124 either by direct contact or through electromagnetic or optical coupling.

Accordingly, when the piston 26 is displaced inside the canister 12, the tracer element 128 is moved along the guide element 126 in response to the movement of the magnet 130 with the piston 26. The sensor element 124 provides a signal that is indicative of the position of the tracer 128, and hence of the piston 26. The signal is then communicated to the outside of canister 12 by terminals 132 and 134, for use by a conventional control means or controller to regulate the flow of the fluid into the canister 12 or the displacement of the piston 26 pushing the fluid. The tracer element 128 may be of the simple construction such as a contact wiper when the sensor element 124 is a resistance potentiometer.

The signal indicating the position of the piston 26 may then be measured by several well known methods. For example, when a voltage $V_o$ is applied between the terminals 132 and 134, a measurement of the current flowing into the potentiometer 124 through the guide wire 126 is a measure of piston position within the canister 12.

When a voltage $V_o'$ is applied between the two end terminals 132 of the potentiometer 124, the voltage between one of the two end terminals 132 and the terminal 134 is a measure of the position of the tracer, and hence the piston 26.

If two equal resistances are connected to the terminals 132, and a voltage $V_o''$ is applied between the terminals 132, in a well known arrangement known as a Wheatstone Bridge, the voltage between the terminal 134 and the junction of the resistances is a measure of the position of the tracer 128.

These methods require that the tracer 128 makes electrical contact with the potentiometer or sensor element 124 and that the guide element 126 is also electrically conductive. A conductive lubricant may be used at the bearing surface between the guide element 126 and the tracer 128 to reduce friction. This improves sensor responsiveness and resolution by preventing restriction or tracer breakaway from the magnetic field.

When the sensor element 124 is other than a potentiometer, the tracer 126 will carry a corresponding signal pick-up device such as a photo sensor and may require multiple guide wire elements, such as 124, to independently communicate the multiple signals that may be required for such sensors.

Figure 12:
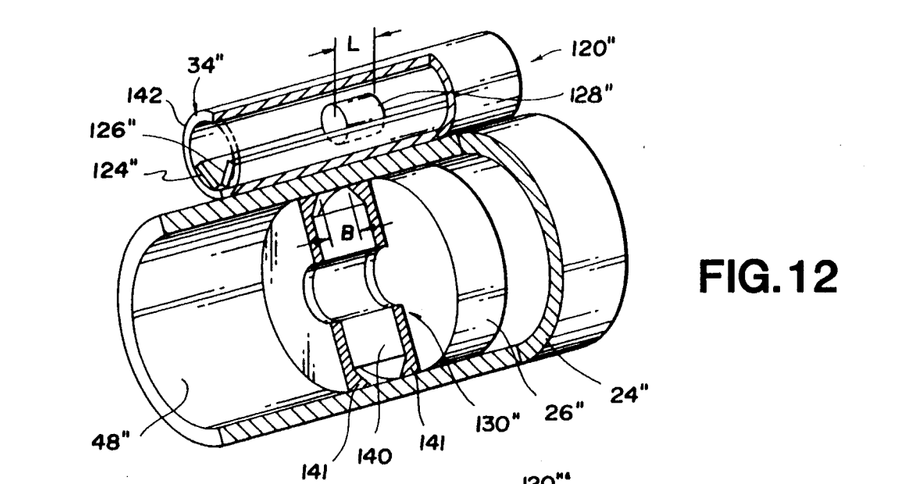

FIG. 12 shows another construction for a sensor, generally indicated at 120", wherein parts having the same or similar construction or function to the parts of the first two constructions have a double prime designation.

In FIG. 12, a magnet assembly, generally indicated at 130", is shown to be constructed of three elements, a permanent magnet 140 sandwiched between a pair of annular side plates 141 which are separated apart at their outer peripheral surfaces by a distance, B. A guide element 126" and a sensor element 124" are formed as flat strips inclined to each other to guide a tracer element 128" sideways as the tracer element 128" is moved by the magnet 140 along their length.

The elements 124", 126" and 128" are enclosed inside a sensor post generally indicated at 34", which is external to the circular periphery of the magnet assembly 130" and also external to a cylinder 24". The guide element 126" and the sensor element 124" are positioned between the magnet assembly 130" and the tracer element 128", hence allowing the magnet 140 to force the tracer element 128" to remain in contact with both the guide and sensor elements, 126" and 124", respectively.

The sensor post 34" is also shrouded by an electrically conductive, and grounded, shield 142 which isolates the sensor elements from external electrical signals which may interfere with the electrical measurements of the sensor, especially when used in a high voltage electrostatic environment such as for electrostatic paint spraying.

The tracer element 128" may be a sphere of a ferromagnetic material, gold plated for surface electrical conductivity and having a diameter D. The tracer element 128" may also be a cylinder of a ferromagnetic material, gold plated and having a length L as illustrated in FIG. 12. Preferably, $D=B$ for a spherical tracer element or, $L=B$ for a cylindrical tracer element 128" for maximum sensor sensitivity and response.

It has been found by extensive experimentation that if D or L is substantially larger than B that the tracer element 128" hesitates before it moves in response to movement of the magnet assembly 130". On the other hand, if D or L is substantially smaller than B, then the tracer element 128" tends, unpredictably, to favor one or the other of the side plates 141". Depending on the thickness of the magnet 140, the side plates 141 may be inclined towards each other at their peripheral surface to provide the distance relationship, $B=L$ or $B=D$. The side plates 141 need not be axi-symmetric especially if the position of the magnet 140 remains angularly fixed relative to the location of the sensor 120". In the particular case described for a fluid transfer device, a piston 26" which carries the magnet assembly 130" to move therewith, has a tendency to rotate inside the cylinder 24"; hence axi-symmetric magnet plates 141 assure continued interaction between the tracer element 128" and the magnet assembly 130".

Figure 13:
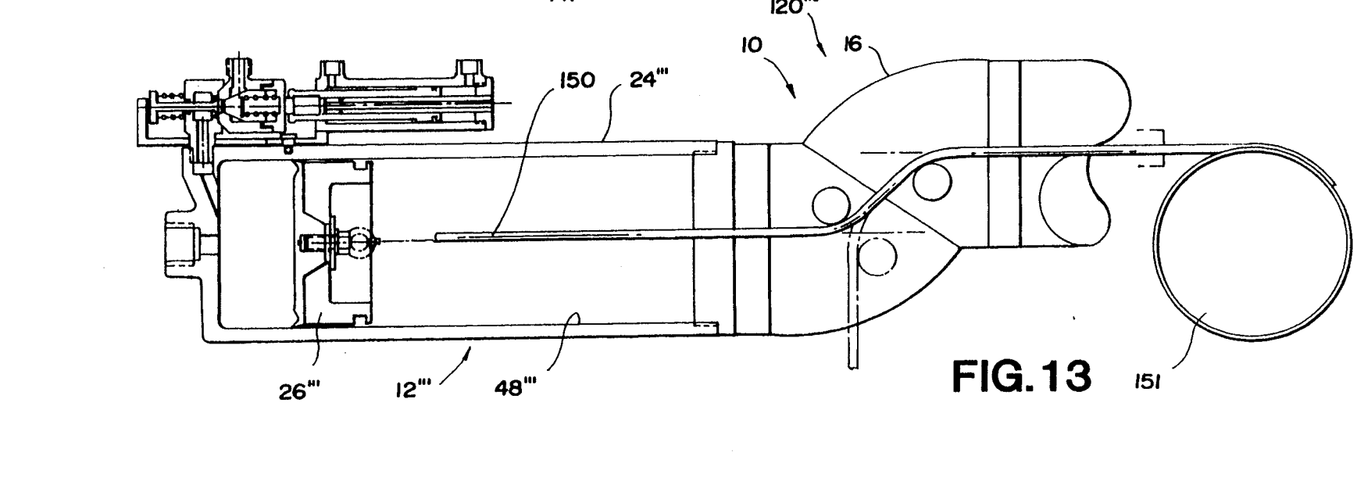

FIG. 13 shows still another embodiment of a sensor generally indicated at 120''' wherein parts having the same or similar construction or function to the parts of the first three constructions have a triple prime designation.

In FIG. 13, linear movement of a piston 26''' is transferred by means of a pliable element, such as a cable 150, to a linear or angular position sensor, such as a linear or angular encoder or sensor assembly 151, located outside a cylinder 24'''. The pliable element helps transfer the linear movement of the piston 26''' through the bends of the wrist 16 of the robotic arm 10 to a location where the assembly 151 can be conveniently located and insulated from the environment of the piston 26''' without increasing the dimensions or weight of a canister 12'''. The cable 150 is connected to the piston 26''' to move therewith. The cable 150 may be constructed from stainless steel and is electrically isolated from the piston 26'''. Alternatively, the cable 150 may be constructed from an electrically non-conductive material such as Kevlar or Nylon fibers.

A sensor utilized in the fluid transfer system is a linear transducer that senses the position of a piston being displaced by the filling fluid and the termination of filling when the piston reaches a location indicating that the desired amount of fluid has entered the container.

A non-contact sensor of the present invention responds to the motion of the piston by means of magnetic coupling wherein there is no physical contact between the moving object and any part of the sensor. By contrast, LVDT's sense motion by magnetic coupling but require that the object physically move one of the sensor elements relative to the other. An LVDT may constitute the sensing element of the third embodiment of the invention which is a pliable element responsive to the motion of the piston.

In two of the embodiments, the piston carries a magnetic field generating mechanism such as a magnet which cooperates with a responsive ferromagnetic tracer of the sensor. The sensor element may be an electrically resistive potentiometer cooperating with the conductive ferromagnetic tracer.

The ferromagnetic tracer in the sensor is preferably a bead made of a conductive ferromagnetic material and is guided along the conductive guide element wire and forced to contact the sensor element by the magnetic force. Since the guide wire or element is conductive, it can communicate a signal of the sensor to a controller. The sensor element is isolated electrostatically and fluidly from the piston and its environment.

While the best mode for carrying out the invention has been described in detail, those familiar with the art to which this invention relates will recognize various alternative designs and embodiments for practicing the invention as defined by the following claims.

What is claimed is:

1. A sensor for sensing the position of a body which moves linearly in an environment, the sensor comprising an assembly including a cavity electrostatically and fluidly insulated from the environment and coupling means having a coupling force for coupling the motion of the body to the outside of the environment, the coupling means being adapted to be connected to the body to move linearly therewith, the assembly further including a conductive guide means disposed within the cavity and a non-magnetized conductive sensor part supported for linear movement on and relative to the guide means, the sensor part being coupled by the coupling means so as to move on the guide means in response to the movement of the body and the coupling force maintains electrical contact between the sensor part and the guide means during movement of the sensor part relative to the guide means wherein the sensor is adapted to provide an electrical signal representative of the position of the body.

2. The sensor of claim 1 wherein coupling means is a magnet magnetically coupled to the sensor part.

3. A non-contact sensor for sensing the linear position of a body which moves linearly in an environment, the sensor comprising an assembly including a cavity electrostatically and fluidly insulated from the environment and generating means for generating a magnetic field within the cavity, the generating means being adapted to be coupled to the body to move linearly therewith, the assembly including a conductive sensor element disposed within the cavity, a conductive guide means disposed within the cavity and a non-magnetized, conductive ferromagnetic device supported for linear movement on the guide means and magnetically coupled to the generating means so as to move relative to and in electrical communication with the guide means and the sensor element in response to movement of the generating means and its magnetic field along the sensor element, and wherein the sensor is adapted to provide a signal representative of the position of the body.

4. The sensor as claimed in claim 3 wherein the generating means includes a magnet.

5. The sensor as claimed in claim 4 wherein the magnet is a cylindrical magnet positioned about the ferromagnetic device and the sensor element.

6. The sensor as claimed in claim 3 wherein the sensor element is an electrically resistive potentiometer.

7. The sensor as claimed in claim 3 wherein the guide means includes a conductive guide wire and wherein the ferromagnetic device is mounted for linear movement within the cavity on the conductive guide wire, the ferromagnetic device being electrically coupled to both the guide wire and the sensor element in the magnetic field.

8. The sensor as claimed in claim 3 wherein the guide means is a conductive wire on which the ferromagnetic device is supported and electrically coupled.

9. The sensor as claimed in claim 3 wherein the body is a piston mounted for linear movement within a cylinder.

10. The sensor as claimed in claim 3 wherein the assembly further includes a hollow central guide member adapted to slidably support the body thereon and in which the ferromagnetic device is supported for movement therein.

11. The sensor as claimed in claim 3 wherein the generating means includes a magnet assembly having a magnet sandwiched between a pair of side plates having outer peripheral surfaces separated by an air gap distance, B.

12. The sensor as claimed in claim 3 wherein the generating means includes an axi-symmetric magnet.

13. The sensor as claimed in claim 11 wherein the ferromagnetic device is gold plated.

14. The sensor as claimed in claim 11 wherein the ferromagnetic device is spherical and has a diameter, D.

15. The sensor as claimed in claim 11 wherein the ferromagnetic device is cylindrical and has a length, L.

16. The sensor as claimed in claim 3 wherein the generating means includes a magnet and wherein the sensor element is external to the magnet.

17. The sensor as claimed in claim 14 wherein D is substantially equal to B.

18. The sensor as claimed in claim 15 wherein L is substantially equal to B.

19. The sensor as claimed in claim 3 or claim 16 wherein the assembly further includes a hollow guide member in which the ferromagnetic device is supported for movement therein and wherein the hollow guide member is shielded with an electrically conductive and grounded shroud.

20. The sensor as claimed in claim 3 wherein the magnetic field between the ferromagnetic device and the generating means maintains electrical contact between the ferromagnetic device and the sensor element during relative movement of the ferromagnetic device.

21. The sensor as claimed in claim 3 wherein the magnetic field between the ferromagnetic device and the generating means maintains electrical contact between the ferromagnetic device and the guide means during relative movement of the ferromagnetic device.

22. A non-contact sensor for sensing the linear position of a body which moves linearly in an environment, the sensor comprising an assembly including a cavity insulated from the environment and generating means for generating a magnetic field within the cavity, the generating means being adapted to be coupled to the body to move linearly therewith, the assembly including a sensor element disposed within the cavity and a ferromagnetic device supported for linear movement within the cavity to move in response to movement of the generating means and its magnetic field along the sensor element wherein the sensor is adapted to provide a signal representative of the position of the body and wherein the assembly further includes a conductive guide wire and wherein the ferromagnetic device is conductive and is mounted for linear movement within the cavity on the conductive guide wire, the ferromagnetic device being electrically coupled to both the guide wire and the sensor element in the magnetic field.

23. A non-contact sensor for sensing the linear position of a body which moves linearly in an environment, the sensor comprising an assembly including a cavity insulated from the environment and generating means for generating a magnetic field within the cavity, the generating means being adapted to be coupled to the body to move linearly therewith, the assembly including a sensor element disposed within the cavity and a ferromagnetic device supported for linear movement within the cavity to move in response to movement of the generating means and its magnetic field along the sensor element wherein the sensor is adapted to provide a signal representative of the position of the body wherein the assembly includes a conductive guide wire and wherein the ferromagnetic device is also conductive and is supported for linear movement on the conductive guide wire and is electrically coupled to the guide wire.

24. A non-contact sensor for sensing the linear position of a body which moves linearly in an environment, the sensor comprising an assembly including a cavity insulated from the environment and generating means for generating a magnetic field within the cavity, the generating means being adapted to be coupled to the body to move linearly therewith, the assembly including a sensor element disposed within the cavity and a ferromagnetic device supported for linear movement within the cavity to move in response to movement of the generating means and its magnetic field along the sensor element and wherein the generating means includes a magnet assembly having a magnet sandwiched between a pair of side plates having outer peripheral surfaces separated by an air gap distance, B.

25. A non-contact sensor for sensing the linear position of a body which moves linearly in an environment, the sensor comprising an assembly including a cavity insulated from the environment and generating means for generating a magnetic field within the cavity, the generating means being adapted to be coupled to the body to move linearly therewith, the assembly including a sensor element disposed within the cavity and a ferromagnetic device supported for linear movement within the cavity to move in response to movement of the generating means and its magnetic field along the sensor element wherein the generating means includes an axi-symmetric magnet.

* * * * *